United States Patent [19]

Russell

[11] Patent Number: 5,288,058
[45] Date of Patent: Feb. 22, 1994

[54] RAILING SYSTEM

[76] Inventor: William W. Russell, 1216 - 18 Street N.E., Calgary, Alberta, Canada, T2E 4V9

[21] Appl. No.: 993,690

[22] Filed: Dec. 21, 1992

[51] Int. Cl.$^5$ ............................................. E04H 17/14
[52] U.S. Cl. .................. 256/69; 256/DIG. 6; 403/200; 403/207; 403/262; 403/264; 403/346
[58] Field of Search ............... 256/69, 65, DIG. 6, 256/59; 403/252, 264, 262, 258, 259, 207, 201, 200, 347

[56] References Cited

U.S. PATENT DOCUMENTS

| | | | |
|---|---|---|---|
| 2,780,440 | 2/1957 | Krieger | 256/65 X |
| 3,233,871 | 2/1966 | Schroer | 256/69 |
| 4,477,059 | 10/1984 | Willis | 256/65 |
| 5,170,996 | 12/1992 | Venegas, Jr. et al. | 256/69 |

Primary Examiner—Randolph A. Reese
Assistant Examiner—Christopher J. Novosad
Attorney, Agent, or Firm—George H. Dunsmuir

[57] ABSTRACT

Skeletal railing systems are usually formed of metal tubing welded together and/or interconnected by metal T-connectors, cross connectors and elbows. The assembling of such railing systems is often time consuming and expensive. A simple alternative includes tubular plastic, preferably polyvinyl chloride posts and rails interconnected by short lengths of metal tubing which extend through openings in the plastic tubes. A bolt perpendicular to one section of metal tubing extends into a plate or plug on the end of the other section of metal tubing, and a nut is tightened onto the bolt to hold the sections together.

3 Claims, 4 Drawing Sheets

RAILING SYSTEM

BACKGROUND OF THE INVENTION

This invention relates to a railing system, and in particular to a skeletal railing system.

Railing systems of the type disclosed herein are usually formed of iron tubing by welding sections of the tubing together, often using elbows, T-connectors and other couplers which are also formed of metal. The building of all metal railing systems of this type is labour intensive and consequently expensive.

Alternate structures are described, for example, in Canadian Patent No. 858,170, which issued to J. B. Schroer on Dec. 15, 1970, and U.S. Pat. Nos. 2,999,671, issued to J. H. Blayden on Sep. 12, 1961 and 4,461,461, which issued to L. Caron on Jul. 24, 1984. The Blayden connector system relies on a plurality of elements which would be expensive to produce and difficult to assemble. The Caron railing possesses the advantage of using plastic pipe. However, the Caron system requires special T-connectors and cross connectors.

BRIEF DESCRIPTION OF THE INVENTION

The object of the present invention is to solve the above mentioned problems by providing a relatively simple, lightweight railing system, requiring few parts, and which can be assembled quickly and easily.

Accordingly, the invention relates to a railing system comprising post means including first plastic tube means for embedding in a concrete pad for supporting the system, first metal tube means in said first plastic tube means extending out of the bottom end thereof for anchoring the post means in a concrete footing and plug means proximate the top end of said first metal tube means; rail means for mounting on said post means for connecting the latter to another similar post means, said rail means including second, elongated plastic tube means and slot means in said second plastic tube means for receiving the top end of said first metal tube means and first, tubular metal coupler means in said second plastic tube means; and bolt means in said first coupler means extending outwardly therefrom for insertion into said plug means for connecting said rail means to said post means.

BRIEF DESCRIPTION OF THE DRAWINGS

The invention will be described in greater detail with reference to the accompanying drawings, which illustrate preferred embodiments of the invention, and wherein.

In the drawings, wherever possible the same reference numerals have been used to identify the same or similar elements in the various views. Moreover, some of the figures are quite schematic, the relative sizes of elements being inaccurate.

DESCRIPTION OF THE PREFERRED EMBODIMENTS

Figure 1:
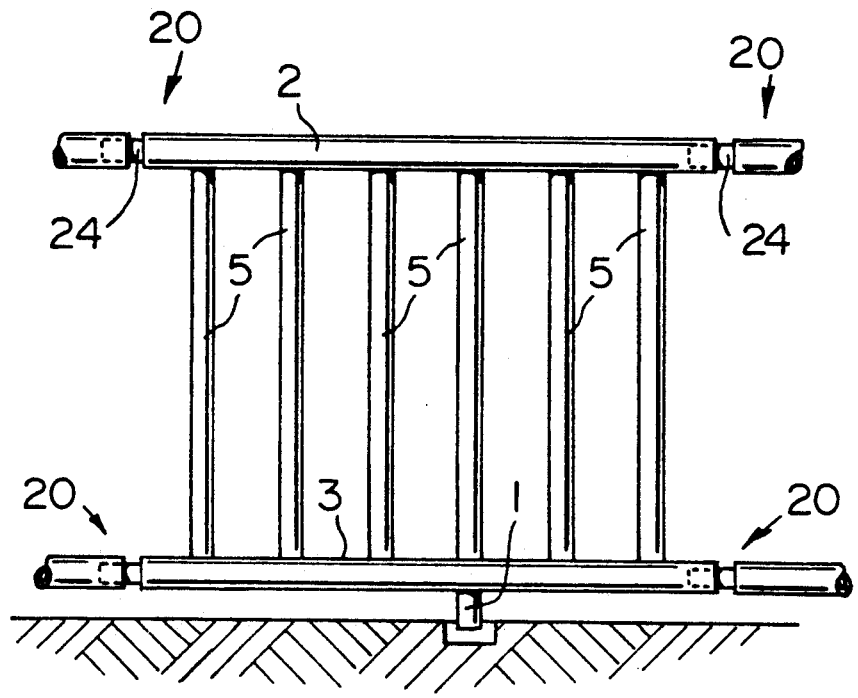
FIG. 1 is a schematic front view of one embodiment of a railing system in accordance with the present invention.

With reference to FIG. 1, the basic elements of a railing system in accordance with the present invention includes a plurality of feet or posts (one shown) supporting, horizontal tubular plastic top and bottom rails 2 and 3, respectively with a plurality of cylindrical, plastic balusters 5 extending there between. The posts 1 are anchored in recesses 7 in a concrete deck or platform 8. For such purpose, each post 1 includes a tubular metal body 10, which is embedded in the concrete 6, and a shorter outer plastic (usually polyvinyl chloride) sleeve 11, covering the upper end of the body 10. The upper end of the body 10 is closed by a circular plate 13, which is welded to interior of the body. The top end of the body 10 is concave (not shown) for conforming to the circular cross section of the bottom rail 3.

The rail 3 is defined by an elongated tubular plastic body 15 containing a short tubular metal coupler 16 for connecting the rail to the post 1. One end of a bolt 17 is welded to the coupler 16. The bolt 17 extends out of an opening 18 in the body 15. The top end of the post 1; is inserted into the opening 18 and the bolt 17 is inserted through the plate 13 in the body 10 of the post 1. A nut 19 is tightened into the bottom end of the bolt 17 before mounting the post 1 in the platform 8 to secure the rail 3 to the post 1.

Figure 3:
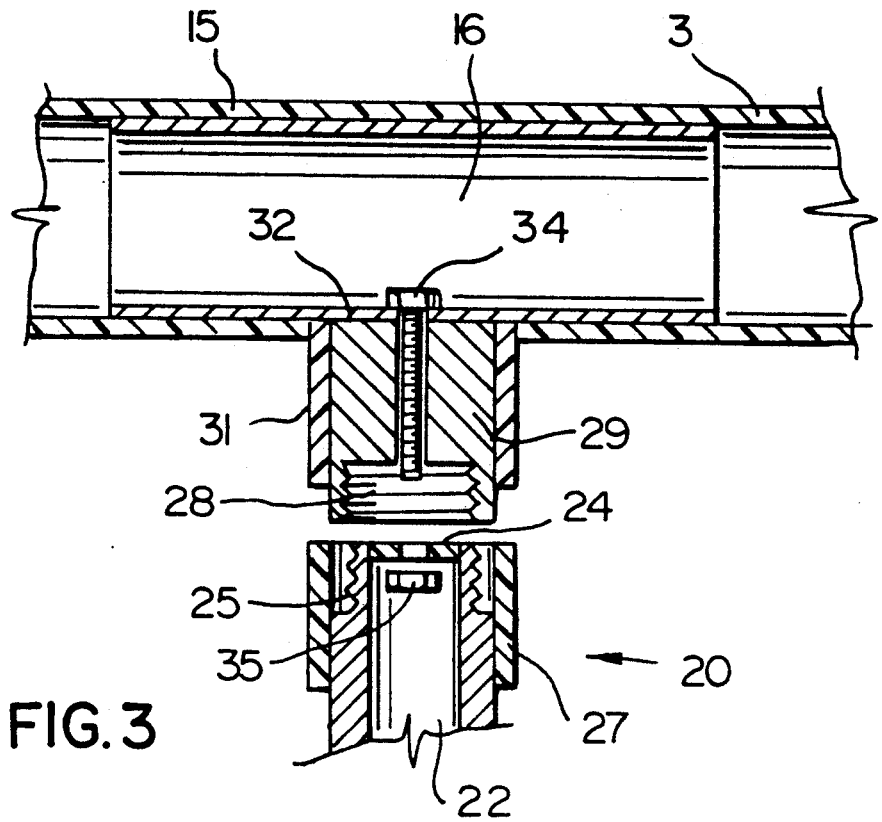
FIG. 3 to 5 are longitudinal sectional views of other embodiments of posts or feet for use in the railing system of FIG. 1.
Figure 4:
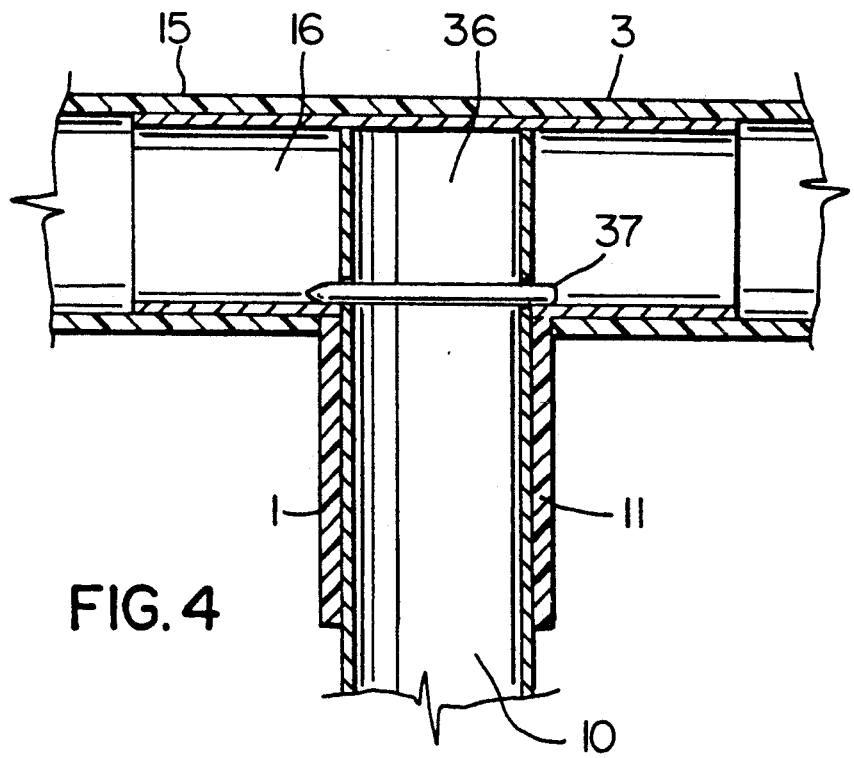

Alternate post to rail connections, which avoid the need for welding, are illustrated in FIGS. 3 and 4. Referring to FIG. 3, an alternative post generally indicated at 20 includes a tubular metal body 22, the bottom end (not shown) of which is embedded in the platform, and the top end of which is closed by a disc 24. The threaded upper end 25 of th body 22 is surrounded by plastic sleeve 27. The upper end 25 is threaded into the internally threaded bottom end 28 of an insert or plug 29 in a plastic sleeve 31. The top end 32 of the insert 28 is concave for conforming to the convex periphery of the coupler 16. When the post 20 is connected to the rail 3, a bolt 34 is inserted through a longitudinally extending hole in the insert 29, and through the plate 24 for receiving a nut 35.

Figure 2:
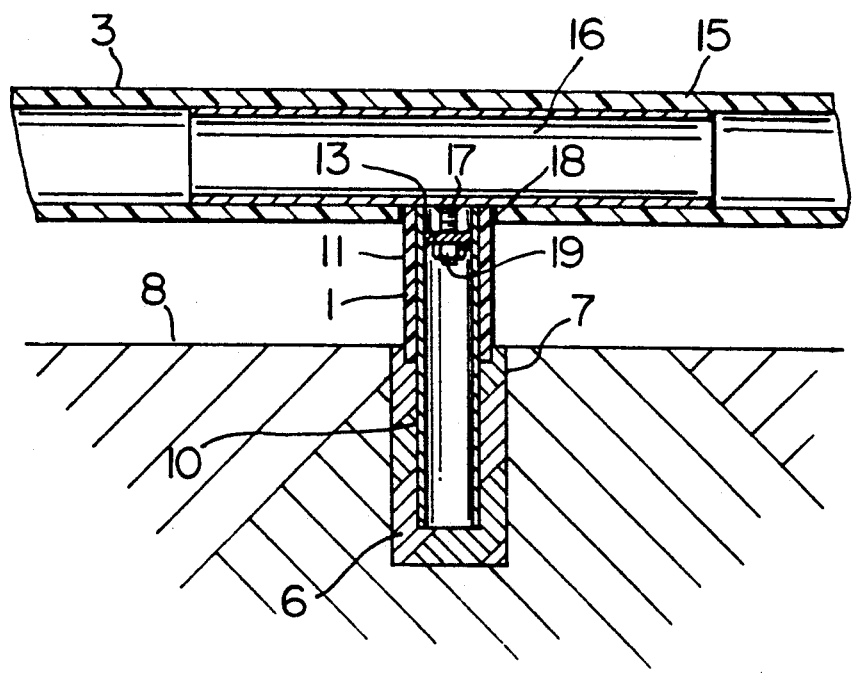
FIG. 2 is a longitudinal sectional view of a post or foot used in the railing system of FIG. 1.

The post 1 of FIG. 4 is similar to that of FIG. 2, except that the plate 13 is omitted, and the top end 36 of body 10 extends upwardly beyond the top end of the sleeve 11. The post 1 is connected to the coupler 16 by inserting the body 10 into the coupler 16 until the top end of the body 10 engages the top of the coupler. The top end of the body 10 is curved to conform to the shape of the interior of the coupler 16. The body 10 is secured in the coupler 16 by a steel pin 37 extending through diametrically opposed holes in the body 10.

Figure 5:
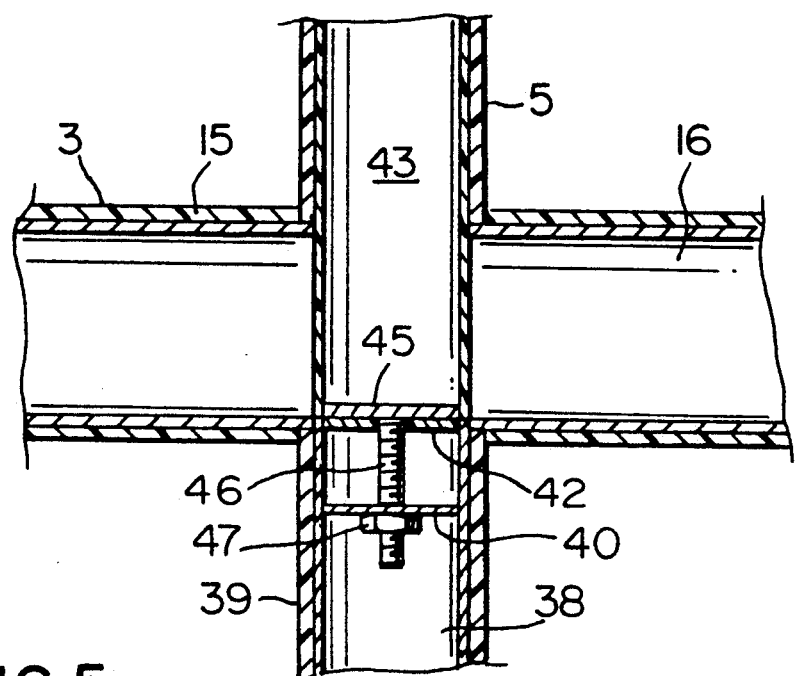

With reference to FIG. 5, another post includes a tubular body 38 for embedding in concrete (not shown) with a sleeve 39 thereon. A disc 40 is provided in the body 38 near the top end thereof, and the top end is closed by a front disc 42. A rail 3 and a plastic baluster 5 are connected thereto by inserting a metal tube 43 extending downwardly from the baluster 5 through an opening in the body 15 and the coupler 16. A second disc 45 with a bolt 46 welded thereto closes the bottom end of the tube 43. In use, the bolt 46 extends downwardly through the discs 42 and 40, and is held in position by a nut 47.

Figure 6:
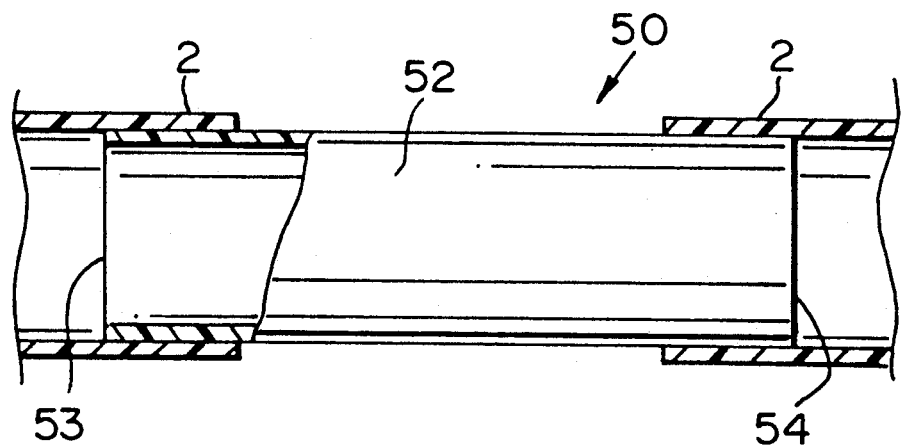
FIG. 6 is a longitudinal section view of a coupler for use in the railing system of FIG. 1.

The top and bottom rails 2 and 3 and the balusters 5 define sections of railing, which are connected to other similar sections of railing by couplers generally indicated at 50 (FIG. 6) defined by short plastic tubes 52. One end 53 of each tube 52 is permanently attached to one rail 2 or 3 by gluing, and the other end 54 is free to slide in the rail 2 or 3 of the adjacent railing sections. Thus, the couplers 50 act as expansion joints between sections of railing.

Figure 7:
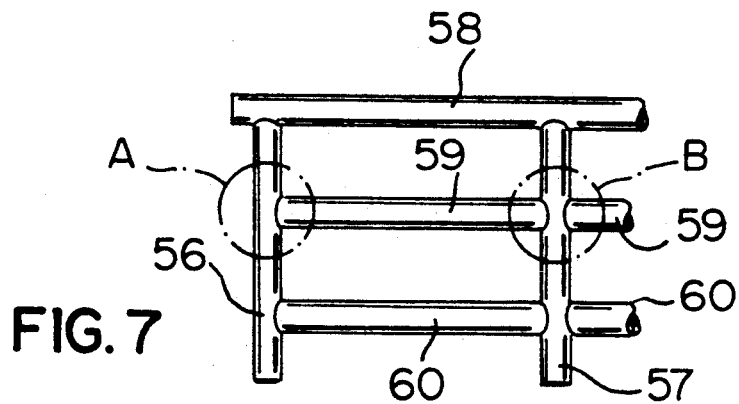
FIG. 7 is a schematic view of a second embodiment of the railing system of the present invention.
Figure 8:
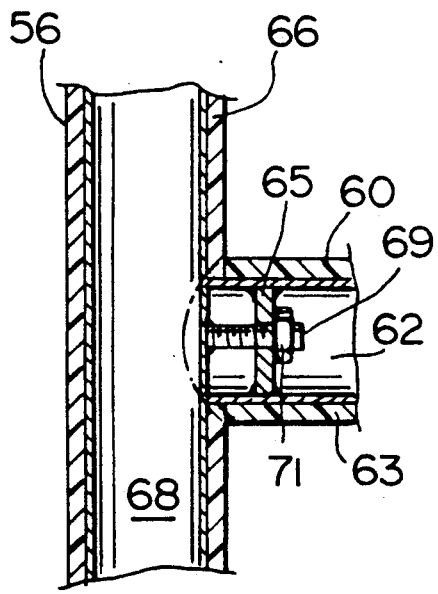
FIG. 8 is a longitudinal sectional view of area A of FIG. 7.
Figure 9:
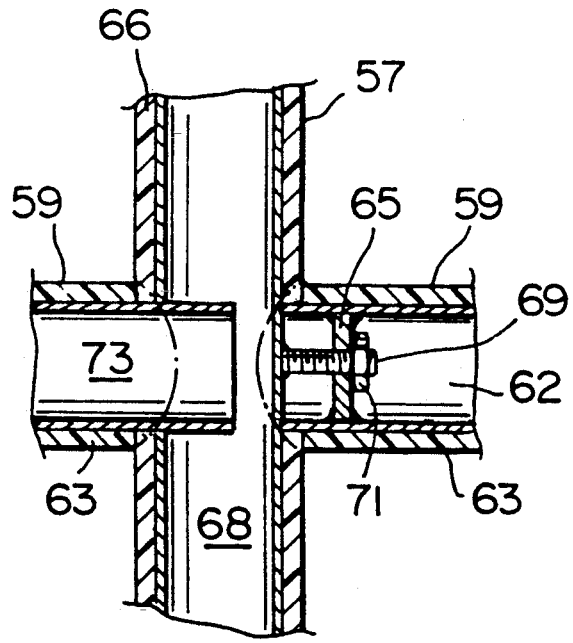
FIG. 9 is a longitudinal sectional view of area B of FIG. 7.

Another railing system in accordance with the invention is shown in FIGS. 7 to 9. In the railing system of FIG. 7 the bottom posts or anchors for mounting the system on a base are omitted. The elements illustrated in FIGS. 2 to 5 are used for such purpose. The railing system of FIG. 7 includes a plurality of posts 56 and 57 (two shown) supporting top, middle and bottom horizontal rails 58, 59 and 60. As best shown in FIG. 8 the end posts 56 are connected to the middle rail 59 by a connection similar to that shown in FIG. 2. A short metal tube 62 is provided in the end of the plastic sleeve 63 defining the body of the rail 60. A disc 65 is welded in the tube 62 near the outer end thereof. The post 56 is defined by a tubular plastic body 66 containing a coupler defined by a short metal tube 68 with a bolt 69 welded to one side thereof. The bolt 69 normally extends outwardly from the centre of an opening in the body 66 of the post. When the outer end of the metal tube 62 is inserted into the opening, the bolt 69 extends through a hole in the disc 65. A nut 71 secures the two elements together.

Referring to FIG. 9, the rail 59 is connected to an intermediate post 57 by a T-connection formed by inserting a short metal tube 73 into one end of the body 63 of the rail 59 on one side of the post 57. The tube 73 extends through aligned openings in the body 66 of the post 57 and in another short metal tube or coupler 68. The end of the adjacent, aligned rail 59 on the other side of the post 57 is provided with a metal tube 62 and a disc 65 similar to those illustrated in FIG. 8 for receiving a bolt 69.

What is claimed is:

1. A railing system comprising post means including first plastic tube means for embedding in a concrete pad for supporting the system, first metal tube means in said first plastic tube means extending out of the bottom end thereof for anchoring the post means in a concrete footing;

third plastic tube means for mounting on rail means above and axially aligned with said first plastic tube means; second metal tube means in said third plastic tube means and second disc means closing the bottom end of said second metal tube means for abutting first disc means;

plug means proximate the top end of said post means; said plug means including first disc means proximate the top end of said first metal tube means for receiving bolt means; and rail means for mounting on said post means for connecting the latter to another similar post means, said rail means including second, elongated plastic tube means and slot means in said second plastic tube means for receiving the top end of said first metal tube means and first, tubular metal coupler means in said plastic tube means; and bolt means carried by said second disc means in said first coupler means extending outwardly therefrom for insertion into said plug means for connecting said rail means to said post means;

said second disc means carrying said bolt means.

2. A railing system according to claim 1, wherein said bolt means is permanently connected to said first coupler means.

3. A railing system according to claim 1, wherein said plug means and said first metal tube means are threaded for releasably connecting said plug means to said first metal tube means.

* * * * *